United States Patent Office 2,957,745
Patented Oct. 25, 1960

2,957,745

DYEING AND PRINTING OF SYNTHETIC HIGH POLYMERIC POLYESTERS

Willy Braun and Ernst Hartwig, Heidelberg, Julius Eisele, Ludwigshafen (Rhine), and Wilhelm Federkiel, Frankenthal, Pfalz, Germany, assignors to Badische Anilin- & Soda-Fabrik Aktiengesellschaft, Ludwigshafen (Rhine), Germany No Drawing. Filed Sept. 25, 1958, Ser. No. 763,162

Claims priority, application Germany Sept. 28, 1957

10 Claims. (Cl. 8—55)

This invention relates to the dyeing and printing of textiles and other materials of synthetic high polymeric polyesters with the aid of diphenylsulfones and dispersion dyestuffs.

It is known that the penetration of dispersion dyestuffs into polyester fibers is accelerated by assistants, so-called carriers. In this way the color strength can be increased considerably. There have been proposed for this purpose for example aromatic hydrocarbons, halogenated aromatic hydrocarbons, aromatic carboxylic acids and their esters, hydroxyalkyl ethers of phenols and of hydroxydiphenyls.

The known assistants are attended however by certain defects; for example, halogenated aromatic hydrocarbons are not sufficiently indifferent physiologically, as confirmed by H. Gnamm in the book "Die Lösungsmittel und Weichhaltungsmittel," Stuttgart 1950, page 110. The agents often cause an odor of chemicals on the fiber or impair the fastness of the dyeings; moreover, they cannot be handled sufficiently simply in use.

The object of this invention is to provide a process for dyeing and printing textiles and other materials of polyesters with dispersion dyestuffs with the co-employment of assistants which considerably accelerate the dyeing and which considerably improve the dyeings and which in the use of the dyed material exert no injurious action on human beings. A further object of the invention is to provide dyestuff preparations containing the said assistants.

We have found that textiles, yarns, fibers, plane structures, powders and films of synthetic polymeric thread-forming polyesters can be dyed and printed in a specially advantageous manner with dispersion dyestuffs by treating them, before or during the dyeing or printing, with diphenylsulfone or its substitution products.

By the term "synthetic polymeric polyesters" there are included within the scope of the invention those highly polymeric linear polyesters the molecules of which have recurring monomeric units connected by ester linkages. Dibasic acids, for example aromatic acids, such as terephthalic acid, diphenyl-4,4'-dicarboxylic acid and/or diphenylsulfone-4,4'-dicarboxylic acid, and glycols, for example ethylene glycol, diethylene glycol, triethylene glycol, propylene glycol and/or butylene glycol, may be used as the monomers to form the polymeric polyesters.

Filaments, threads, yarns, fibers, and staple fibers, and planar structures such as textiles, woven fibers or fabrics, ribbons, tapes and films are intended herein to be included by the term filamentary to filmaceous material. The dyeing of particulated or powdery polyesters is also to be included within the scope of the invention. The term "dyeing" is used herein to define coloring a polyester material by means of printing pastes or the like as well as by dilute dispersions of the dyestuff in aqueous baths.

Besides diphenylsulfone itself

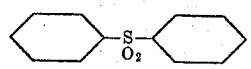

there may be used for example diphenylsulfones substituted by hydroxyl groups and/or by halogen, as for example halogen diphenylsulfones, such as 4,4'-dichlorodiphenylsulfone and 4,4'-dibromodiphenylsulfone or 4-hydroxy-4'-bromodiphenylsulfone. Mixtures of these or other disulfones are also suitable.

In the following disclosure the term "diphenylsulfones" stands for diphenylsulfone itself and for substituted diphenylsulfone.

Dispersion dyestuffs are defined on page 167 of the book "The Chemistry of Synthetic Dyes and Pigments," New York 1955, and are listed for example in the book of Vickerstaff "The Physical Chemistry of Dyeing," pages 258 to 274.

Dyestuffs of the azo, azomethine and anthraquinone series as well as nitro dyes can be used as dispersion dyestuffs. The term "disperse dyestuffs" is often employed instead of "dispersion dyestuffs."

The filamentary to filmaceous material can be treated according to the usual prescriptions for dyeing with dispersion dyestuffs, when using the diphenylsulfones. Information regarding the usual dyeing methods may be found for example on page 259 of the above-mentioned book of Vickerstaff. The diphenylsulfones may be added to the dyebath or padding bath in finely divided form or as solutions, for example in dimethylformamide or acetone. Dispersions or pastes of the diphenylsulfones prepared with the aid of dispersing agents, for example water-soluble condensation products of cresol-formaldehyde resins with 2-naphthol-6-sulfonic acid or condensation products of 2-naphthalene sulfonic acid with formaldehyde, are also suitable forms of application for addition to the dyebath. The diphenylsulfones may also be mixed with the dyestuffs to form ready-made dyestuff preparations.

Dyestuff preparations such as powdered concentrates and printing pastes which contain dispersion dyestuffs and diphenylsulfones also lie within the scope of the invention. Furthermore, the invention also includes polyester materials containing dispersion dyestuffs and the diphenylsulfone carrier.

The goods to be dyed may also be introduced, prior to dyeing, into a bath which contains for example 0.1 to 50 grams per liter of a diphenylsulfone; the treatment temperature may lie between 0° and 200° C.; and the treatment period may be, for example, 1 second to 120 minutes.

The advantages of the dyeing assistants according to this invention over those hitherto used are extraordinary; the agents according to this invention do not impair the fastness of the dyeings; they are more productive and even in small amounts cause an acceleration of the dyeing and a deepening of the shade of color; and they are easy to handle and are physiologically indifferent.

The following examples will further illustrate this invention, but the invention is not restricted to these examples. The parts specified in the examples are parts by weight.

*Example 1*

100 parts of a fabric of a polyethylene terephthalate of which the molecular weight may lie between 8,000 and 13,000 (see Carpenter, J. Soc. Dyers, volume 65, pages 453 to 478, 1949) are dyed for 90 minutes at boiling temperature in a bath of 0.5 part of the finely divided dyestuff 1-amino-2-methoxy-4-hydroxyanthraquinone and 6 parts of finely divided diphenylsulfone in 3,000 parts of water.

Rose dyeings with good fastness properties are obtained. The dyeings are considerably deeper in color and more fast than dyeings which have been prepared without the addition of diphenylsulfone.

*Example 2*

100 parts of polyethylene terephthalate threads are treated in a bath of 0.8 part of the finely divided dyestuff 1-amino-4-cyclohexylaminoanthraquinone-2-carboxylic acid amide and 8 parts of finely divided 4-chlorodiphenylsulfone in 2,000 parts of water for 2 hours at boiling temperature.

Blue dyeings are obtained which are considerably deeper in color and faster than those prepared without the 4-chlorodiphenylsulfone.

*Example 3*

100 parts of polyethylene terephthalate fabric are treated for 90 minutes at boiling temperature in a bath of 0.5 part of the finely divided azo dyestuff derived from diazotized paranitraniline and diphenylamine and 8 parts of finely divided 4,4'-dibromodiphenylsulfone in 2,000 parts of water. The fabric is then given an aftertreatment in a bath of 2 parts of sodium dithionite and 2 parts of 3% caustic soda solution in 2,000 parts of water for 15 minutes at 75° C.

Orange dyeings are obtained which are deeper and faster than the dyeings prepared with the same dyestuff but without the addition of 4,4'-dibromodiphenylsulfone.

*Example 4*

100 parts of a fabric of polyethylene terephthalate are dyed for 60 minutes at boiling temperature in a bath which consists of 4,000 parts of water, 1 part of the dyestuff 1,4-diamino-2-methoxyanthraquinone in finely divided form and 8 parts of finely divided 4-hydroxy-4'-bromodiphenylsulfone.

After dyeing, the fabric is treated in a bath consisting of 4,000 parts of water, 4 parts of sodium hydrosulfite and 4 parts of caustic soda solution (38° Baumé) for 15 minutes at 70° C.

Deep rose dyeings with very good fastness properties are obtained.

*Example 5*

Polyester fabric is printed with a paste which contains in 1,000 parts 30 parts of the finely divided azo dyestuff derived from para-nitraniline→aniline, 50 parts of diphenylsulfone in finely divided form, 20 parts of diisobutyl phosphate, 10 parts of the sodium salt of the disulfonimide of a mixture of hydrocarbons containing on an average about 10 carbon atoms in the molecule, 630 parts of crystal gum and 260 parts of water, dried and steamed for 15 minutes at 0.5 atmosphere excess pressure.

After the usual aftertreatment, deep orange prints of good fastness properties are obtained.

*Example 6*

100 parts of polyethylene terephthalate fabric are treated for 20 minutes at boiling temperature in a bath of 8 parts of finely divided diphenylsulfone in 4,000 parts of water. Then the bath is cooled to 40° C., 1 part of the finely divided dyestuff 1,4-diamino-5-nitroanthraquinone added and brought to the boiling temperature within 15 minutes. It is then dyed for 75 minutes at 98° to 100° C.

Violet dyeings with very good fastness properties are obtained. These dyeings are much deeper in color and faster than dyeings which have been prepared without the pretreatment with diphenylsulfone.

Films or powders of polyesters can be dyed in substantially the same manner.

Dyestuff preparations which are suitable for the process of the present invention may for example contain the following constituents:

|  | Parts by weight | | |
|---|---|---|---|
| Dispersion dyestuff (100%) | 20<br>15 | 35 | 25 |
| Diphenylsulfone or substituted diphenylsulfone. | 20<br>25 | 5 | 15 |
| Dispersing agent, for example, the condensation product of naphthalene sulfonic acid and formaldehyde. | 60<br>60 | 60 | 60 |

As dispersing agents there are also suitable other textile assistants which are used together with dyestuffs or are mixed with dyestuffs, as for example isopropylnaphthalene sulfonic acid sodium salt in admixture with proteins, for example glue; also ethoxylation products of alcohols.

The dyestuff preparations may also contain, in addition to or instead of dispersing agents, other assistants as for example sodium sulfate, sodium chloride, sodium acetate or an alkali phosphate.

The term dyestuff preparations is intended to include also printing pastes and therefore the usual assistants for printing pastes may also be co-employed, as for example agents promoting dispersion of the dyestuff, such as benzyl alcohol or sodium salts of mono- or dibenzylsulfanilic acids, as such or in admixture with the sodium salt of alpha-naphthalene sulfonic acid or sulfanilic acid.

It is pointed out that the use of diphenylsulfones in dyestuff preparations or in conjunction therewith is the essential feature according to this invention. Therefore, the choice of the dispersing agents, printing paste auxiliaries and other dyeing assistants which the dyestuff preparations can contain in admixture with the dyestuffs and/or the diphenylsulfones is left to those skilled in the art. There can be used as dispersing agents anionic, cationic and nonionic, monomeric and polymeric or resinous, water-soluble and water-insoluble, inorganic and organic assistants.

It is surprising to the expert that so simple a compound as diphenylsulfone itself, which we prefer in carrying out the invention, should facilitate and favor the dyeing of polyester material with dispersion dyestuffs more than the assistants which have hitherto been used for this purpose.

*Example 7*

100 parts of polyethylene terephthalate sheeting is dyed for 1 hour at boiling temperature in a bath consisting of 0.5 part of the finely distributed dyestuff 1,4-diamino-5-nitro-anthraquinone and 4 parts of finely distributed diphenylsulfone in 2,000 parts of water.

A violet coloration is obtained which is considerably deeper in shade and faster than colorations produced in the absence of diphenylsulfone.

We claim:
1. A process for dyeing and printing a synthetic polymeric linear polyester formed as the polycondensation product of dibasic aromatic acids and dihydroxy alcohols with dispersion dyestuffs which comprises applying said dispersion dyestuff to said polyester in the presence of a member of the class consisting of diphenylsulfone and its chloro, bromo, and hydroxy substitution products.
2. The process according to claim 1 wherein the synthetic polymeric polyester is introduced, prior to dyeing, into a bath which contains 0.1 to 50 grams per liter of said diphenylsulfone.
3. The process according to claim 1 wherein the synthetic polymeric polyester is dyed in a dyebath which contains a dispersion dyestuff and said diphenylsulfone.
4. The process according to claim 1 wherein the synthetic polymeric polyester is dyed with a printing paste which contains a dispersion dyestuff and said diphenylsulfone.

5. The process according to claim 1 wherein the synthetic polymeric linear polyester is polyethylene terephthalate.

6. A dyestuff composition comprising a dispersion dyestuff in admixture with a member of the class consisting of diphenylsulfone and its chloro, bromo, and hydroxy substitution products.

7. A process as in claim 1 wherein said member is diphenylsulfone.

8. A process as in claim 1 wherein said member is 4-chlorodiphenylsulfone.

9. A process as in claim 1 wherein said member is 4,4'-dibromodiphenylsulfone.

10. A process as in claim 1 wherein said member is 4-hydroxy-4'-bromodiphenylsulfone.

References Cited in the file of this patent

Bowker: British Rayon and Silk Journal, July 1951, p. 59.
Fern: J.S.D.C., December 1955, pp. 842–844.
Dierkes: J.S.D.C., March 1956, p. 123.